US012161893B2

(12) United States Patent
Mason

(10) Patent No.: US 12,161,893 B2
(45) Date of Patent: Dec. 10, 2024

(54) PERSONAL PROTECTIVE SYSTEM AND METHODS OF USE

(71) Applicant: Stanley C. Mason, Fayette, AL (US)

(72) Inventor: Stanley C. Mason, Fayette, AL (US)

( * ) Notice: Subject to any disclaimer, the term of this patent is extended or adjusted under 35 U.S.C. 154(b) by 330 days.

(21) Appl. No.: 17/222,255

(22) Filed: Apr. 5, 2021

(65) Prior Publication Data

US 2021/0308498 A1 Oct. 7, 2021

Related U.S. Application Data

(60) Provisional application No. 63/005,694, filed on Apr. 6, 2020.

(51) Int. Cl.

*A62B 18/04* (2006.01)
*A62B 7/10* (2006.01)
*A62B 7/12* (2006.01)
*A62B 18/00* (2006.01)
*A62B 23/02* (2006.01)

(52) U.S. Cl.

CPC ................ *A62B 18/04* (2013.01); *A62B 7/10* (2013.01); *A62B 7/12* (2013.01); *A62B 18/006* (2013.01); *A62B 23/02* (2013.01)

(58) Field of Classification Search

CPC ......... A62B 18/04; A62B 18/006; A62B 7/10; A62B 7/12; A62B 23/02; A62B 18/00; A62B 18/02; A62B 18/045; A62B 18/084; A62B 17/04; A62B 9/00; A62B 9/04; A62B 9/006; A62B 7/00; A45D 20/22; A45D 20/26; A45D 20/34; A61M 16/0627; A41D 13/1153

USPC .......................................................... 128/863

See application file for complete search history.

(56) References Cited

U.S. PATENT DOCUMENTS 5,009,225 A * 4/1991 Vrabel ................. A62B 18/006 128/202.19

6,609,515 B2 8/2003 Bienvenu et al.

(Continued)

FOREIGN PATENT DOCUMENTS

CN 201988077 U 9/2011
CN 110251138 9/2019

(Continued)

OTHER PUBLICATIONS

Hubbard, Benjamin R. and Pearce, Joshua M., Conversion of Self-Contained Breathing Apparatus Mask to Open Source Powered Air-Purifying Particulate Respirator for Fire Fighter COVID-19 Response, Jul. 27, 2020, https://www.sciencedirect.com/science/article/pii/S2468067220300389.

*Primary Examiner* — Alireza Nia
*Assistant Examiner* — Daniel A Miller
(74) *Attorney, Agent, or Firm* — Bradley Arant Boult Cummings LLP; Michael Casey Williams; Jessica L. Zurlo

(57) ABSTRACT

Personal protective systems for filtering incoming air flow to the user are provided. The personal protective systems include head gear shaped to be worn over the head of a user, a tube having a first end operatively connected to the head gear and a second end operatively connected to an air supply unit, where the air supply unit is configured to propel filtered air through the tube to the head gear, thereby creating an overpressure inside the head gear and protecting the user from transmission of harmful airborne particles.

17 Claims, 4 Drawing Sheets

(56) References Cited

U.S. PATENT DOCUMENTS

| | | | | |
|---|---|---|---|---|
| 7,296,570 | B2 * | 11/2007 | Hutchinson | A61M 16/0683 128/857 |
| 2011/0265790 | A1 * | 11/2011 | Walker | A42B 3/286 128/201.23 |
| 2014/0345627 | A1 | 11/2014 | Younts | |
| 2016/0243383 | A1 | 8/2016 | Yazdi et al. | |
| 2017/0001048 | A1 * | 1/2017 | Volmer | F04D 25/0673 128/202.19 |
| 2020/0179547 | A1 | 6/2020 | Choi | |
| 2020/0206544 | A1 * | 7/2020 | Vaughan | A62B 17/04 |
| 2020/0297962 | A1 * | 9/2020 | Teng | A61M 16/0875 |
| 2021/0219636 | A1 * | 7/2021 | Stroiazzo-Mougin | A62B 23/02 |

FOREIGN PATENT DOCUMENTS

| | | | | |
|---|---|---|---|---|
| CN | 211910598 | U | 11/2020 | |
| CN | 112023216 | A | 12/2020 | |
| GB | 2032284 | A * | 5/1980 | A62B 18/045 |
| JP | 6752778 | | 9/2020 | |
| KR | 20170069674 | | 6/2017 | |
| KR | 101841153 | | 5/2018 | |
| WO | 2018059255 | | 4/2018 | |

* cited by examiner

PERSONAL PROTECTIVE SYSTEM AND METHODS OF USE

CROSS REFERENCE TO RELATED APPLICATIONS

This application claims the benefit of and priority to U.S. Provisional Application No. 63/005,694, filed on Apr. 6, 2020, and entitled "Personal Protective System With Light Overpressure," the disclosure of which is expressly incorporated by reference in its entirety.

TECHNICAL FIELD

The present disclosure relates generally to personal protective systems, and more particularly to portable air purifying systems for use in preventing the spread of disease.

BACKGROUND

There are a number of airborne particles (for example, infectious microbial particles, respiratory droplets, dust particles, and pollutants) that are dangerous to humans when the particles are inhaled or exposed to the conjunctiva of the eyes. Coughing, sneezing, and even breathing, result in airborne viruses and bacteria entering and being expelled through the mouth and nose and then into the respiratory system. Viral infectious diseases, such as human respiratory tract infections, can be particularly dangerous for humans when the infectious particles enter the body. This is particularly troublesome in medical facilities, such as hospitals, where without protection these airborne infectious diseases can be spread quickly.

Historically, medical personnel have utilized medical masks made of a fibrous material to prevent respiratory emanations from passing through the medical mask and contaminating other people. However, these medical mask must allow both oxygen and carbon dioxide to pass through the surgical mask during normal breathing by the wearer. Furthermore, these medical masks are not entirely efficient at stopping particulate matter with viruses and bacteria from exiting the mask.

Accordingly, there remains a need in the art for systems and methods that can better prevent airborne transmission of infectious and other harmful particles through the respiratory system.

SUMMARY

The problems expounded above, as well as others, are addressed by the following inventions, although it is to be understood that not every embodiment of the inventions described herein will address each of the problems described above. The present disclosure provides personal protective systems that protect the wearer from airborne transmission of infectious and other harmful particles.

In one embodiment, a personal protective system is disclosed, the personal protective system including head gear shaped to be worn over the head of a user; a tube having a first end operatively connected to the head gear and a second end operatively connected to an air supply unit; wherein the air supply unit is configured to propel filtered air through the tube to the head gear, thereby creating an overpressure inside the head gear. In some embodiments, the head gear includes one or more punctures for releasing exhaled air from the user. In another embodiment, the air supply unit includes a fan operatively connected to and disposed over a filter. In still another embodiment, the filter includes an activated carbon (charcoal) filter, a high efficiency particulate air (HEPA) filter, a PM2.5 filter, a MERV13 or MERV16 filter, or any combination thereof. In other embodiments, the second end of the tube is operatively connected to the fan. In yet other embodiments, the head gear is formed of a material selected from vinyl film, acetate, polyethylene, polypropylene, polystyrene, cellophane, or combinations thereof.

In another embodiment, a personal protective system is disclosed, the personal protective system including head gear shaped to be worn over the head of a user, wherein the head gear comprises an inlet and an outlet; an inlet tube having a first end operatively connected to the inlet of the head gear and a second end operatively connected to an air supply unit comprising a fan system and a first filter; an exit tube having a first end operatively connected to the outlet of the head gear and a second end operatively connected to a container having a second filter coupled thereto; wherein the fan system is configured to propel air through the first filter and into the inlet tube, thereby creating an overpressure inside the head gear.

In some embodiments, the second end of the outlet tube is positioned within the container and under the second filter. In other embodiments, the fan system further includes a fan and a fan control circuit, the fan control circuit operatively connected to an adjustable speed control for regulating the rate of incoming air flow produced by the fan. In yet another embodiment, the level of pressure inside the head gear is less than 2 atm. In still other embodiments, the head gear further includes a fastener for attachment to the user. In another embodiment, each of the first filter and the second filter include a minimum collection efficiency of 99.97 percent. In yet another embodiment, the fan is powered by a rechargeable battery having at least 2000 mAh. In some embodiments, the head gear further includes a transparent portion, the transparent portion having a fog-resistant coating applied thereto. In still other embodiments, the transparent portion comprises goggles, a face shield, a visor, or any combination thereof.

In still another embodiment, a personal protective system is disclosed, the personal protective system including a hood capable of enclosing the head and neck of a user, wherein the hood includes an inlet for receiving clean air and an outlet for releasing exhaled air; a waist band including an air supply unit removably attached thereto, wherein the air supply unit includes a fan operatively connected to a first filter; an inlet tube having a first end operatively connected to the inlet of the hood and a second end operatively connected to the fan; an exit tube having a first end operatively connected to the outlet of the hood and a second end operatively connected a container having a second filter coupled thereto; wherein the fan is configured to draw air through the first filter and into the inlet tube, thereby creating a level of overpressure in the hood that is greater than static atmospheric pressure of an environment external to the user. In another embodiment, the level of overpressure in the hood is less than two times the static atmospheric pressure of the environment external to the user. In still another embodiment, the hood is formed of a material that is impermeable to air.

BRIEF DESCRIPTION OF THE DRAWINGS

Further features and advantages can be ascertained from the following detailed description that is provided in connection with the drawings described below.

DETAILED DESCRIPTION

Figure 1A:
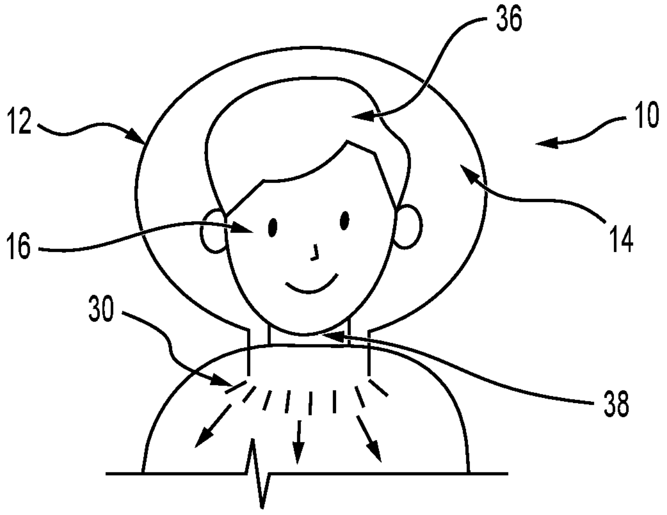
FIG. 1A is a front view of a personal protective system according to an embodiment of the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, more preferably within 5%, and still more preferably within 1% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural (i.e., "at least one") forms as well, unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Spatially relative terms, such as "above," "under," "below," "lower," "over," "upper," and the like, may be used herein for ease of description to describe one element or feature's relationship to another when the apparatus is right side up as shown in the accompanying drawings.

Terms such as "at least one of A and B" should be understood to mean "only A, only B, or both A and B." The same construction should be applied to longer lists (e.g., "at least one of A, B, and C").

The term "may" as used herein refers to features that are optional (i.e., "may or may not,"), and should not be construed to limit what is described.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The present disclosure provides personal protective systems that can be worn by medical professionals, patients, and any other personnel that require protection from airborne transmission of infectious and other harmful particles. The personal protective systems of the present disclosure are able to filter incoming air flow to the user by creating an overpressure within the system through the use of low volume air movement. The systems prevent or limit the transmission and spread of airborne viruses and diseases. The personal protective systems can, by constant air in-flow, also prevent users from producing virus friendly wet surfaces unlike current face masks and shields. Moreover, the systems are predominantly disposable and inexpensive due to the simplicity and worldwide availability of the materials that are utilized to maintain the system.

Figure 1B:
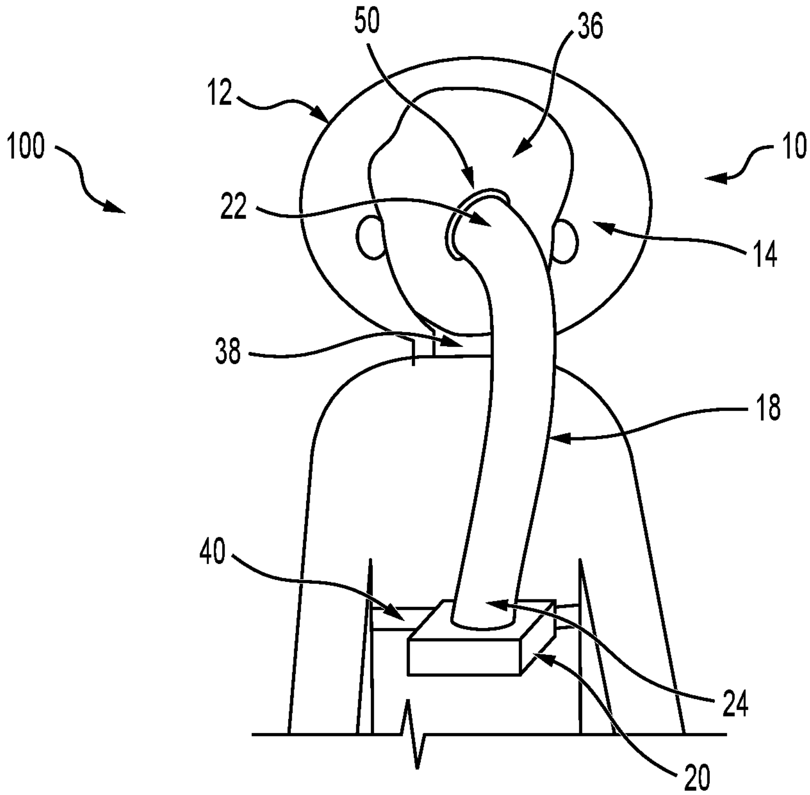
FIG. 1B is a rear view of the personal protective system according to an embodiment of the present disclosure.

Referring to FIGS. 1A and 1B, a personal protective system 100 according to an exemplary embodiment of the present disclosure is shown. The personal protective system 100 is utilized to protect against the spread of airborne diseases. The personal protective system 100 shown in FIGS. 1A and 1B may be worn, for instance, by a medical professional, a patient at a healthcare facility, law enforcement, the military, or other personnel that are susceptible to airborne transmission of infectious and other harmful particles. The personal protective system 100 delivers constant clean air to the entire head of the wearer. The personal protective system 100 includes head gear 10 that encloses the head 36 of the individual wearing the system 100. The head gear 10 includes a hood 12 that is capable of enclosing the head 36 and neck 38 of the wearer. The hood 12 forms an interior cavity 14 that is sealed from air in the surrounding external environment. The interior cavity 14 creates a breathing zone for the user to breathe in clean air. As used herein, "clean air" refers to air that has been filtered or that otherwise has been made safe to breathe.

In some embodiments, the head gear 10 may include a transparent portion 16 located in front of the wearer's face when the head gear 10 is worn so that the wearer can see through the head gear 10. The transparent portion 16 may be sized and shaped to allow for a wide horizontal and lateral field of view. The transparent portion 16 may be formed of any type of material having excellent optical properties, durability, and flexibility. In one embodiment, the transparent portion 16 may be a face shield or visor that is integrally formed with the hood 12 so as to provide an air-tight seal. In other embodiments, the transparent portion 16 may be goggles that are integrally formed with the hood 12 so as to provide an air-tight seal. In some embodiments, a non-fogging or fog-resistant coating may be applied to the transparent portion 16. Examples of suitable non-fogging or fog-resistant coatings include, but are not limited to, silicone coatings and fluoro-chemical coatings. However, any non-fogging or fog-resistant coating is optional as the constant stream and exhaust of pressurized air provided by the systems of the present disclosure will prevent moisture.

The head gear 10 may be formed of any type of lightweight, inflatable material that blocks the penetration of airborne particulate contaminants. In one embodiment, the head gear 10 may be formed of a polymeric material. Suitable polymeric materials include, but are not limited to, vinyl film, acetate, polyethylene, polypropylene, and polystyrene. In other embodiments, the head gear 10 may be formed of cellophane. In a preferred embodiment, the head gear 10 is formed of a loose-fitting material to allow the wearer of the head gear 10 to use medical gear, such as stethoscopes and the like. In some embodiments, the head gear 10 may also include an attachment mechanism for securing the head gear 10 to the wearer. For example, the head gear 10 may include one or more bands or straps (not shown) for attaching the head gear 10 around the neck 38 of the wearer. Other suitable attachment mechanisms include garments, such as a lightweight scarf or an elastic turtleneck, and adhesives, such as medical stretch tape.

An inlet tube 18 provides clean air into the interior cavity 14 of the head gear 10. The inlet tube 18 operatively connects the head gear 10 to an airflow supply unit 20. The inlet tube 18 has a first end 22 that is connected to an inlet 50 defined along the periphery of the hood 12 and a second end 24 that is connected to the airflow supply unit 20. Clean air travels through the inlet tube 18 from the airflow supply unit 20 and enters the head gear 10 through the inlet 50 on the hood 12. The inlet tube 18 may have any length sufficient to ensure that the air entering the head gear 10 is sufficiently far away such that no airborne viruses or bacteria can infect the wearer. For example, the first tube 18 may be approximately four feet long. In another embodiment, the inlet tube 18 may be approximately six feet long. In still another embodiment, the inlet tube 18 may be approximately eight feet long. The inlet tube 18 may be formed of a flexible polymeric material, such as vinyl film, acetate, polyethylene, polypropylene, and polystyrene.

The second end 24 of the inlet tube 18 is operatively connected to an airflow supply unit 20. In one embodiment, the airflow supply unit 20 includes a fan system 26 and a filter 28. The fan system 26 pulls ambient air through the filter 28 and into the inlet tube 18 so that clean air enters the head gear 10. In this manner, filtered or clean air is provided to the wearer. In this embodiment, the second end 24 of the inlet tube 18 is operatively connected to the fan system 26.

In some embodiments, the fan system 26 is configured to push a sufficient volume of clean air through the inlet tube 18 and into the head gear 10 to create an overpressure in the head gear 10. That is, the fan system 26 may push a sufficient volume of clean air through the inlet tube 18 to create a level of pressure in the head gear 10 that is greater than the static atmospheric pressure outside of the head gear 10. In this embodiment, the overpressure in the head gear 10 may inflate the inlet tube 18 and the head gear 10. This allows for greater breathability within the head gear 10.

In some embodiments, the value of overpressure created in the head gear 10 is less than 2 atm. For example, the value of pressure created in the head gear 10 may be less than about two times the atmospheric pressure outside of the head gear 10. In another embodiment, the value of pressure created in the head gear 10 may be less than about 1.5 times the atmospheric pressure outside of the head gear 10. In still another embodiment, the value of pressure created in the head gear 10 may be less than about 20 percent over standard atmospheric pressure. In yet another embodiment, the value of pressure created in the head gear 10 may be less than about 10 percent over standard atmospheric pressure.

Advantageously, the personal protective system 100 provides for an increase in air pressure within the head gear 10 along with a low but adequate air refresh rate, which in turn, based on the activity and comfort level of the wearer, maintains a healthful breathing environment of about 20 to 40 liters per minute for the wearer. The personal protective system 100 also provides high comfort levels for the wearer, which allows for more optimal sanitary compliance. For example, the overpressure created in the head gear 10 allows the wearer to retain natural levels of moisture in the eyes, nose, lips, skin, and throat areas.

The head gear 10 allows exhaled air to escape via its adjustable fit. In one embodiment, the exhaled air from the wearer may escape around the base of the head gear 10, which is located near the base of the wearer's neck, as shown by the arrows in FIG. 1A. The overpressure created within the head gear 10 prevents contaminants from entering the head gear 10 in that all air is supplied through the airflow supply unit 20. In another embodiment, the exhaled air from the wearer may escape through one or more downwardly directed punctures 30 located along the periphery of the head gear 10. For instance, one or more punctures 30 may be formed along the periphery of the base of the head gear 10. In some embodiments, frontal puncture 30 may be configured for insertion of a straw to provide hydration, nutrients, and medicine to the wearer. In still another embodiment, as will be described in more detail below, the exhaled air from the wearer may escape through an exhaust filtration pathway, such as an exit tube.

In one embodiment, the personal protective system 100 is mounted to the body of the wearer so that the wearer may easily move around while the system 100 is attached thereto. As illustrated in FIG. 1B, the airflow supply unit 20 is removably attached to a waist band 40 to make the personal protective system 100 easier to wear. The waist band 40 may be adjustable to adapt to the size of the wearer. The airflow supply unit 20 may be attached to the waist band 40 using any type of removable attachment mechanisms including, but not limited to, clips, magnets, hook and loop fasteners, snap fasteners, adhesives, and pressure fit connections. While the use of the waist band 40 has been described herein as an exemplary attachment mechanism, it will be readily apparent to one of ordinary skill in the art that the airflow supply unit 20 may be attached to the wearer by other attachment mechanisms including back straps. In still other embodiments, the airflow supply unit 20 may be located separate and apart from the wearer. For instance, the airflow supply unit 20 may be positioned on a portable cart or table that is located in close proximity to the wearer and can move with the user.

Figure 2A:
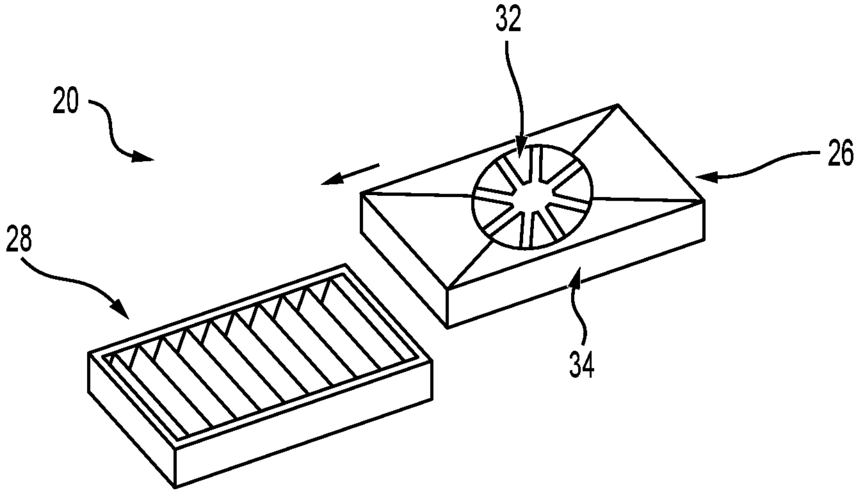
FIG. 2A is an exploded view of an airflow supply unit according to an embodiment of the present disclosure.
Figure 2B:
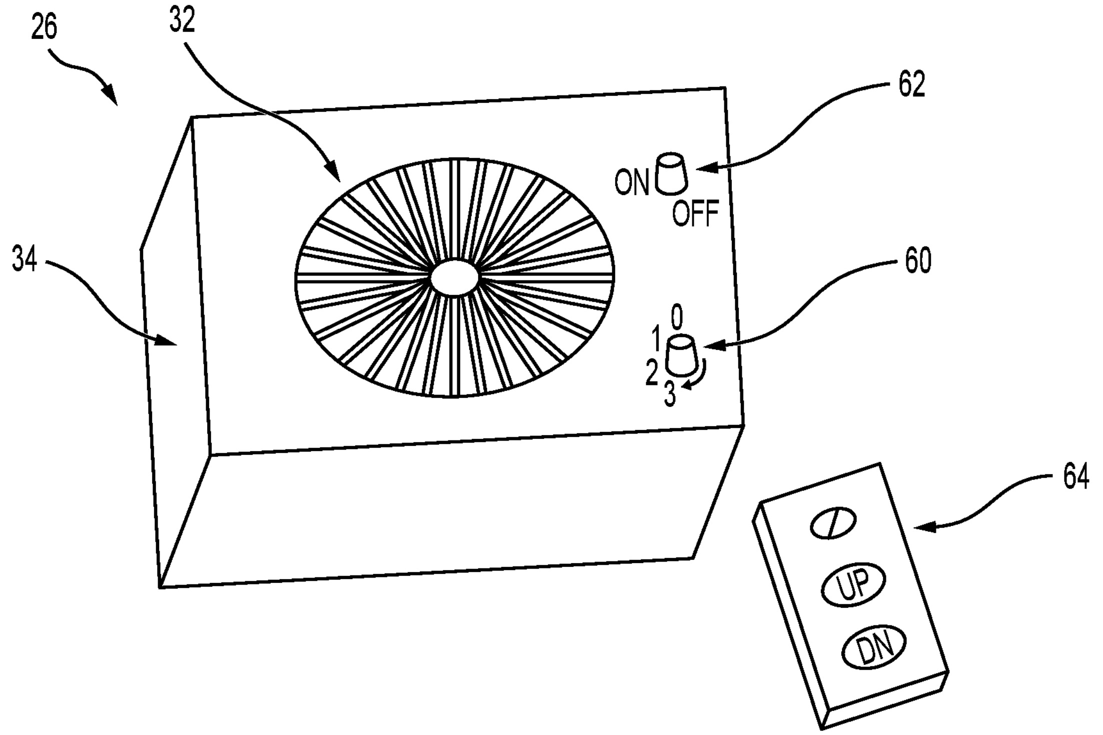
FIG. 2B is a perspective view of a fan system according to an embodiment of the present disclosure.
Figure 2C:
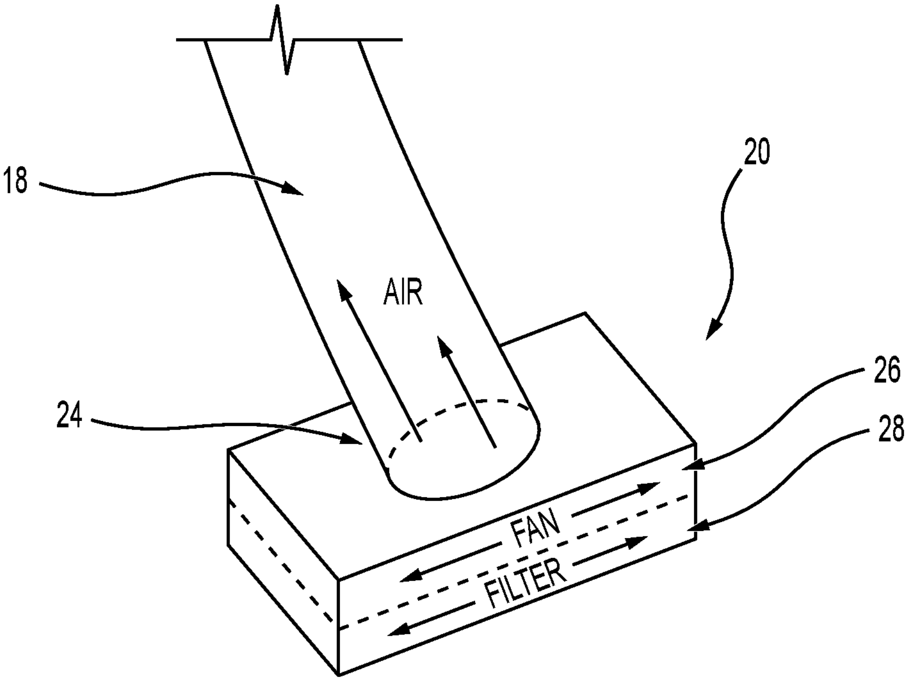
FIG. 2C is a perspective view of the airflow supply unit attached to an inlet tube according to an embodiment of the present disclosure.

FIGS. 2A, 2B, and 2C show the airflow supply unit 20, including the fan system 26 and the filter 28, according to an exemplary embodiment of the present disclosure. As shown in FIG. 2A, the airflow supply unit 20 includes the fan system 26 and the filter 28. In the illustrated embodiment, the fan system 26 includes a fan 32 situated within a housing 34. The fan 32 may be lightweight and designed to operate for extended periods of time. In one embodiment, the fan 32 may have a run time of at least about 2 hours. In another embodiment, the fan 32 may have a run time of at least about 3 hours. In still another embodiment, the fan 32 may have a run time of at least about 4 hours.

In one embodiment, the fan system 26 includes a fan control circuit (not shown) for regulating the actuation of the fan 32. As shown in FIG. 2B, the fan control circuit may be operatively connected to a power button 62 and an adjustable speed control 60 for regulating the amount of air volume pumped into the inlet tube 18. The adjustable speed control 60 allows for the incoming air flow to be increased or decreased depending on the desired air exchange rate and the pressure level inside the head gear 10. Indeed, if the fan 32 does not pump enough air into the inlet tube 18, the pressure within the head gear 10 may be too low and reduce comfortability and breathability within the head gear 10. If the fan 32 pumps too much air into the inlet tube 18, the pressure within the head gear 10 may be too high and the excessive overpressure exchange rate will result in evaporation of any natural moisture on the wearer's face or neck. As such, the adjustable speed control 60 can regulate the rate of incoming air flow produced by the fan 32. The adjustable speed control 60 may be operatively connected to a remote 64 that allows the user to adjust the speed of the fan 32 from a distance away from the fan system 26.

Due to the portable nature of the fan system 26, the fan 32 may be powered by a battery that can be positioned within the housing 34. In one embodiment, the battery is rechargeable so that it may be reused. In other embodiments, the battery may be non-rechargeable or disposable. The battery may be of any size sufficient to power the fan 32. For example, the size of the battery may range from about 2000 mAh up to 10,000 mAh or 12,000 mAh. In still other embodiments, the fan 32 may be powered by plugging the fan 32 into an electrical receptacle in close proximity to the personal protective system 100.

As shown in FIG. 2C, the fan system 26, including the fan 32, is operatively attached above the filter 28 and the inlet tube 18 is operatively attached to the fan 32 within the fan system 26. When the fan 32 draws in air from the external environment, the air is pushed upward through the filter 28 and into the inlet tube 18. The incoming air flow inflates the head gear 10 for inhalation of the wearer and the exhaled air exits around the neck/shoulders of the wearer. The fan system 26 and the filter 28 work in combination to maintain the positive overpressure in the head gear 10 and a constant stream of fresh air while removing gases exhaled by the wearer. In other embodiments, the filter 28 may be integrally formed with the fan 32 such that the fan 32 includes the filter 28 within the housing 34.

The filter 28 may include any type of filter with low airflow resistance effective for particulate filtration. Suitable filters for particulate filtration may include, but are not limited to, activated carbon (charcoal) filters, high efficiency particulate air (HEPA) filters, PM2.5 filters, and MERV13 or MERV16 filters. In a preferred embodiment, the filter 28 includes a HEPA filter having a minimum collection efficiency of 99.97 percent. In this embodiment, the filter 28 is capable of filtering any particle having a size of about 0.3 microns or more.

Figure 3A:
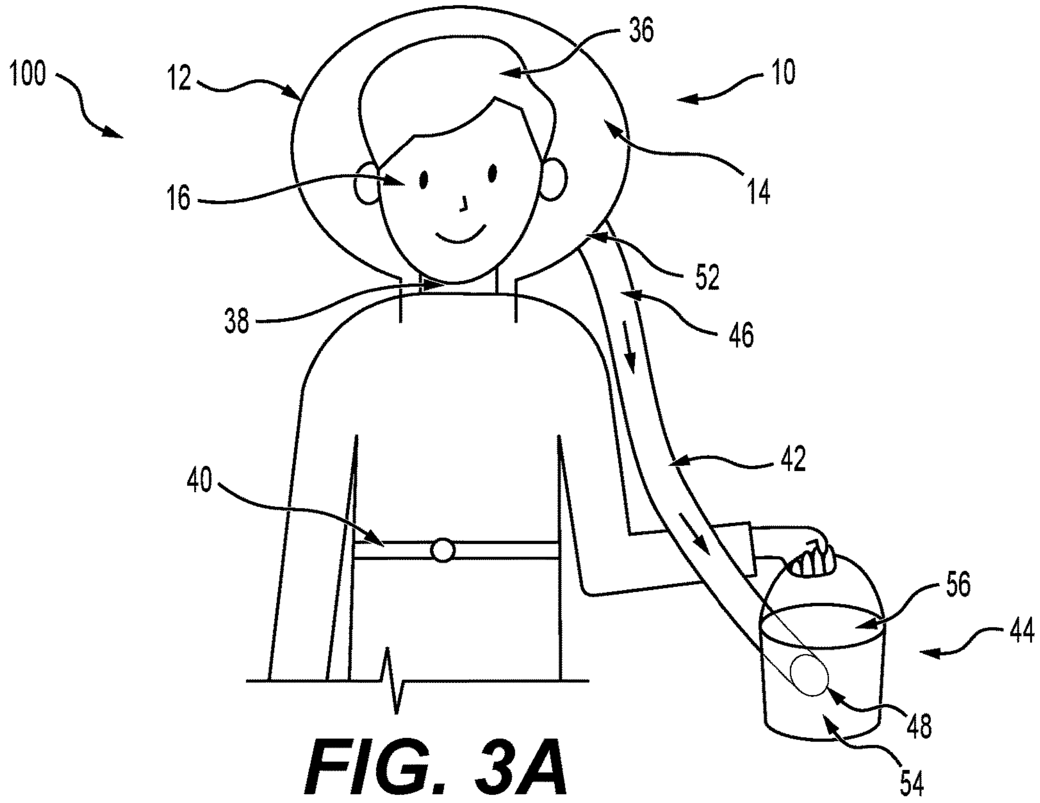
FIG. 3A is a front view of the personal protective system according to another embodiment of the present disclosure.
Figure 3B:
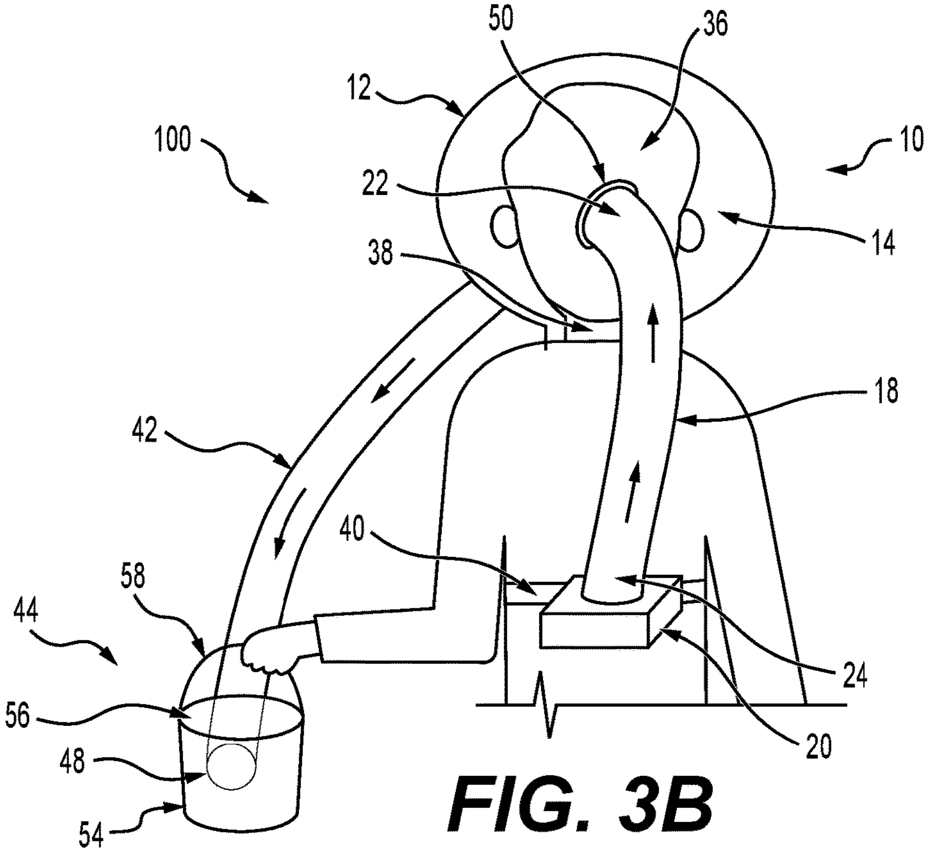
FIG. 3B is a rear view of the personal protective system according to another embodiment of the present disclosure.

FIGS. 3A and 3B illustrate the personal protective system 100 according to another embodiment of the present disclosure. Similar to the embodiment described in FIGS. 1A and 1B, the personal protective system 100 shown in FIGS. 3A and 3B includes the head gear 10, the inlet tube 18, and the air supply unit 20 including the fan system 26 and the filter 28. However, in this embodiment, the personal protective system 100 also includes an exit tube 42 that allows exhaled air to be discharged from the head gear 10. In this embodiment, the personal protective system 100 may be worn by a patient where the exit tube 42 may be connected so that the air coming from the head gear 10 is released through the exit tube 42 at a location that does not spread disease. For example, the exit tube 42 may be connected so that air being released from the head gear 10 exits the medical facility. The personal protective system 100 shown in FIGS. 3A and 3B is particularly advantageous when transporting patients, for instance, those who are exhibiting symptoms of a contagious viral infection, in and out of a healthcare facility.

The exit tube 42 has a first end 46 that is operatively connected to the head gear 10 so that air may be discharged from the head gear 10. The exit tube 42 should be sufficiently long enough so that air exits at a distance far enough away from the patient and any medical professionals to prevent the spread of airborne diseases. For example, the exit tube 42 may be approximately four feet long. In another embodiment, the exit tube 42 may be approximately six feet long. In still another embodiment, the exit tube 42 may be approximately eight feet long. The exit tube 42 may be formed of a polymeric material, such as vinyl film, acetate, polyethylene, polypropylene, and polystyrene.

As shown in FIGS. 3A and 3B, the exit tube 42 has a first end 46 that is connected to an outlet 52 defined along the periphery of the hood 12 of the head gear 10 and a second end 48 that is operatively attached to a filtered container 44. The exit tube 42 is provided so that exhaled air from the wearer can be discharged to the filtered container 44. In this manner, airborne biological pathogens are killed within the filtered container 44 without carrying the risk of infecting medical professionals or other patients.

The filtered container 44 includes a portable compartment 54 having an air filter 56 releasably coupled thereto. As illustrated, the air filter 56 is positioned at the top of the portable compartment 54 so that the air filter 56 covers an opening in the portable compartment 54. The second end 48 of the exit tube 42 is positioned within the portable compartment 54 and under the air filter 56 so that the discharged air is provided in the portable compartment 54 and below the air filter 56. The air filter 56 can be easily replaced and maintained since the air filter 56 is located at the top of the portable compartment 54 and can be quickly removed from the portable compartment 54. However, those of ordinary skill in the art will appreciate that the air filter 56 can be located at the bottom of the portable compartment 54 or along the sides so long as the second end 48 of the exit tube 42 is positioned under the air filter 56. The filtered container 44 may also include a handle 58 that allows for easy transportation of the container 44.

The portable compartment 54 is sized and dimensioned to hold a volume of at least about 10 liters, but other suitable sizes and dimensions are contemplated. The portable compartment 54 may be for a one time use and disposed of after use. In other embodiments, the portable compartment 54 may be washable and reusable. For instance, the portable compartment 54 may be formed of a rigid material, such as polypropylene, copolyester, high-density polyethylene (HDPE), low-density polyethylene (LDPE), stainless steel, and aluminum. In some embodiments, an interior portion of the portable compartment 54 may include one or more chemicals capable of killing viral particles, such as hydrogen peroxide, ammonia, bleach, and combinations thereof. The air filter 56 may include any of the filters described above for use with the filter 28. In one embodiment, the air filter 56 is a HEPA filter having a minimum collection efficiency of 99.97 percent.

In still other embodiments, the second end 48 of the exit tube 42 may be designed to release the exhaled air directly into a location that does not spread disease, such as a highly ventilated area (like the outside environment). In another embodiment, the exhaled air may be released into an area configured to kill viral particles, such as an area heated to a temperature of at least about 170° F. For example, the exhaled air may be released into a designated air incinerator or ozone generator area.

The personal protective system 100 has been described herein for use in the healthcare industry, for instance, for protection against airborne infectious diseases. However, those of ordinary skill in the art will appreciate that the personal protective system 100 may be used for other applications. For example, the personal protective system 100 may be used by the military for protection against biological warfare agents and for use in reconnaissance missions. By way of another example, the personal protective system 100 disclosed herein may be worn by workers for protection against hazardous industrial aerosols, such as asbestos and lead dust.

The foregoing description illustrates and describes the processes, manufactures, compositions of matter, and other teachings of the present disclosure. Additionally, the disclosure shows and describes only certain embodiments of the processes, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, manufactures, compositions of matter, and other teachings of the present disclosure and to enable others skilled in the art to utilize the teachings of the present disclosure in such, or other, embodiments and with the various modifications required by the particular applications or uses. Accordingly, the processes, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A personal protective system, comprising:

head gear shaped and configured to be worn over a head of a user, wherein the head gear comprises an inlet and an outlet for releasing air exhaled by the user and the head gear is formed of an inflatable material;

an inlet tube having a first end operatively connected to the inlet of the head gear and a second end operatively connected to an air supply unit comprising a fan and a first filter, wherein the fan is powered by a rechargeable battery and the fan has a run time of at least about 2 hours;

wherein the fan is configured to propel air through the first filter and into the inlet tube, thereby causing the head gear to inflate and create an overpressure inside the head gear, and wherein the outlet comprises a plurality of punctures formed in the inflatable material and arranged along a bottom periphery of the head gear.

2. The personal protective system of claim 1, wherein the head gear further comprises a transparent portion, the transparent portion having a fog-resistant coating applied thereto.

3. The personal protective system of claim 2, wherein the transparent portion comprises goggles, a face shield, a visor, or any combination thereof.

4. The personal protective system of claim 1, wherein the fan further comprises a fan control circuit, the fan control circuit operatively connected to an adjustable speed control for regulating the rate of incoming air flow produced by the fan.

5. The personal protective system of claim 1, wherein the level of pressure inside the head gear is less than 2 atm.

6. The personal protective system of claim 1, wherein the head gear further comprises a fastener configured to attach the head gear to the user.

7. The personal protective system of claim 1, wherein the first filter comprises a minimum collection efficiency of 99.97 percent.

8. The personal protective system of claim 1, wherein the rechargeable battery has at least 2000 mAh.

9. A personal protective system, comprising:

head gear shaped and configured to be worn over a head of a user, wherein the head gear is formed of an inflatable material;

a tube having a first end operatively connected to the head gear and a second end operatively connected to an air supply unit, the air supply unit comprising a fan operatively connected to and disposed over a filter, wherein the fan is powered by a rechargeable battery and the fan has a run time of at least about 2 hours;

wherein the air supply unit is configured to propel filtered air through the tube to the head gear, thereby causing the head gear to inflate and create an overpressure inside the head gear, and wherein the head gear comprises an outlet for releasing air exhaled by the user, the outlet comprising a plurality of punctures formed in the inflatable material and arranged along a bottom periphery of the head gear.

10. The personal protective system of claim 9, wherein the filter comprises an activated carbon (charcoal) filter, a high efficiency particulate air (HEPA) filter, a PM2.5 filter, a MERV13 or MERV16 filter, or any combination thereof.

11. The personal protective system of claim 9, wherein the second end of the tube is operatively connected to the fan.

12. The personal protective system of claim 9, wherein the head gear is formed of a material selected from vinyl film, acetate, polystyrene, cellophane, or combinations thereof.

13. The personal protective system of claim 9, wherein each of the plurality of punctures has a diameter sufficient to prevent the exhaled air from re-entering the head gear.

14. The personal protective system of claim 9, wherein the plurality of punctures is formed along the bottom periphery of a front portion of the head gear.

15. A personal protective system, comprising:

a hood configured to enclose a head and neck of a user, wherein the hood comprises an inlet for receiving clean air and an outlet for releasing exhaled air and the hood is formed of an inflatable material;

a waist band comprising an air supply unit removably attached thereto, wherein the air supply unit comprises a fan operatively connected to a first filter, and wherein the fan is powered by a rechargeable battery and the fan has a run time of at least about 2 hours;

an inlet tube having a first end operatively connected to the inlet of the hood and a second end operatively connected to the fan;

wherein the fan is configured to draw air through the first filter and into the inlet tube, thereby causing the hood to inflate and create a level of overpressure in the hood that is greater than static atmospheric pressure of an environment external to the user, and wherein the outlet comprises a plurality of punctures formed in the inflatable material and arranged proximately adjacent to each other in a horizontal direction along a bottom periphery of the hood.

16. The personal protective system of claim 15, wherein the level of overpressure in the hood is less than two times the static atmospheric pressure of the environment external to the user.

17. The personal protective system of claim 15, wherein the hood is formed of a material that is impermeable to air.

* * * * *